United States Patent
Molter et al.

(10) Patent No.: US 10,057,292 B2
(45) Date of Patent: Aug. 21, 2018

(54) METHOD FOR OPERATING A SECURITY GATEWAY OF A COMMUNICATION SYSTEM FOR VEHICLES

(71) Applicants: Continental Teves AG & Co. oHG, Frankfurt (DE); Continental Automotive GmbH, Hannover (DE); Continental Automotive Systems, Inc., Auburn Hills, MI (US)

(72) Inventors: Hans Gregor Molter, Darmstadt (DE); Stefan Kruber, Wenzenbach (DE)

(73) Assignees: Continental Teves AG & Co. oHG (DE); Continental Automotive GmbH (DE); Continental Automotive Systems, Inc., Auburn Hills, MI (US)

( * ) Notice: Subject to any disclaimer, the term of this patent is extended or adjusted under 35 U.S.C. 154(b) by 85 days.

(21) Appl. No.: 15/101,003

(22) PCT Filed: Dec. 11, 2013

(86) PCT No.: PCT/US2013/074306
§ 371 (c)(1),
(2) Date: Jun. 2, 2016

(87) PCT Pub. No.: WO2015/088506
PCT Pub. Date: Jun. 18, 2015

(65) Prior Publication Data
US 2016/0301714 A1    Oct. 13, 2016

(51) Int. Cl.
*H04L 29/06* (2006.01)
*G06F 12/00* (2006.01)
(Continued)

(52) U.S. Cl.
CPC .............. *H04L 63/20* (2013.01); *G06F 12/00* (2013.01); *H04L 12/00* (2013.01); *H04L 12/6418* (2013.01); *H04L 49/15* (2013.01)

(58) Field of Classification Search
CPC .... H04L 63/123; H04L 63/1408; G06F 21/60
(Continued)

(56) References Cited

U.S. PATENT DOCUMENTS 8,126,611 B2    2/2012  Isoyama
9,419,802 B2*   8/2016  Lortz ................... G06F 15/177
(Continued)

FOREIGN PATENT DOCUMENTS

DE    112008000664    1/2010

OTHER PUBLICATIONS

International Search Report for International Application No. PCT/US2013/074306 dated May 16, 2014.

*Primary Examiner* — Morshed Mehedi
*Assistant Examiner* — Viral S Lakhia
(74) *Attorney, Agent, or Firm* — RatnerPrestia

(57) ABSTRACT

A method for operating a security gateway between data buses of a vehicle, in which a correlation between an identification information item (ID) of the message (N) and a processing rule (VR) is provided by a routing matrix (RM) for each message (N) arriving on a data bus, wherein, at least one processing rule (VR) allocated to an identification information item (ID) has a reference information item (POLICY) to a security rule (SR) stored in a memory unit, which rule is used for filtering the message (N) having this identification information item (ID) by an interpreter (IP). In an alternative solution, the reference information (POLICY) is omitted.

8 Claims, 2 Drawing Sheets

(51) Int. Cl.
*H04L 12/00* (2006.01)
*H04L 12/933* (2013.01)
*H04L 12/64* (2006.01)

(58) Field of Classification Search
USPC .............................. 726/10–13; 701/1; 455/1
See application file for complete search history.

(56) References Cited

U.S. PATENT DOCUMENTS

| | | | |
|---|---|---|---|
| 9,565,308 B2* | 2/2017 | Wawrzynowicz | H04M 3/5141 |
| 9,809,169 B1* | 11/2017 | Naboulsi | B60R 1/025 |
| 9,820,658 B2* | 11/2017 | Tran | A61B 5/0006 |
| 2001/0000193 A1* | 4/2001 | Boden | H04L 45/00 |
| | | | 726/13 |
| 2003/0149766 A1* | 8/2003 | Syvanne | H04L 63/0227 |
| | | | 709/224 |
| 2005/0221752 A1* | 10/2005 | Jamieson | H04L 45/04 |
| | | | 455/1 |
| 2008/0043976 A1 | 2/2008 | Maximo | |
| 2010/0114403 A1* | 5/2010 | Isoyama | H04L 12/40006 |
| | | | 701/1 |
| 2014/0032800 A1* | 1/2014 | Peirce | H04L 67/12 |
| | | | 710/105 |
| 2017/0142156 A1* | 5/2017 | Shiraishi | H04L 63/20 |
| 2017/0305368 A1* | 10/2017 | Markham | B60R 16/0231 |

\* cited by examiner

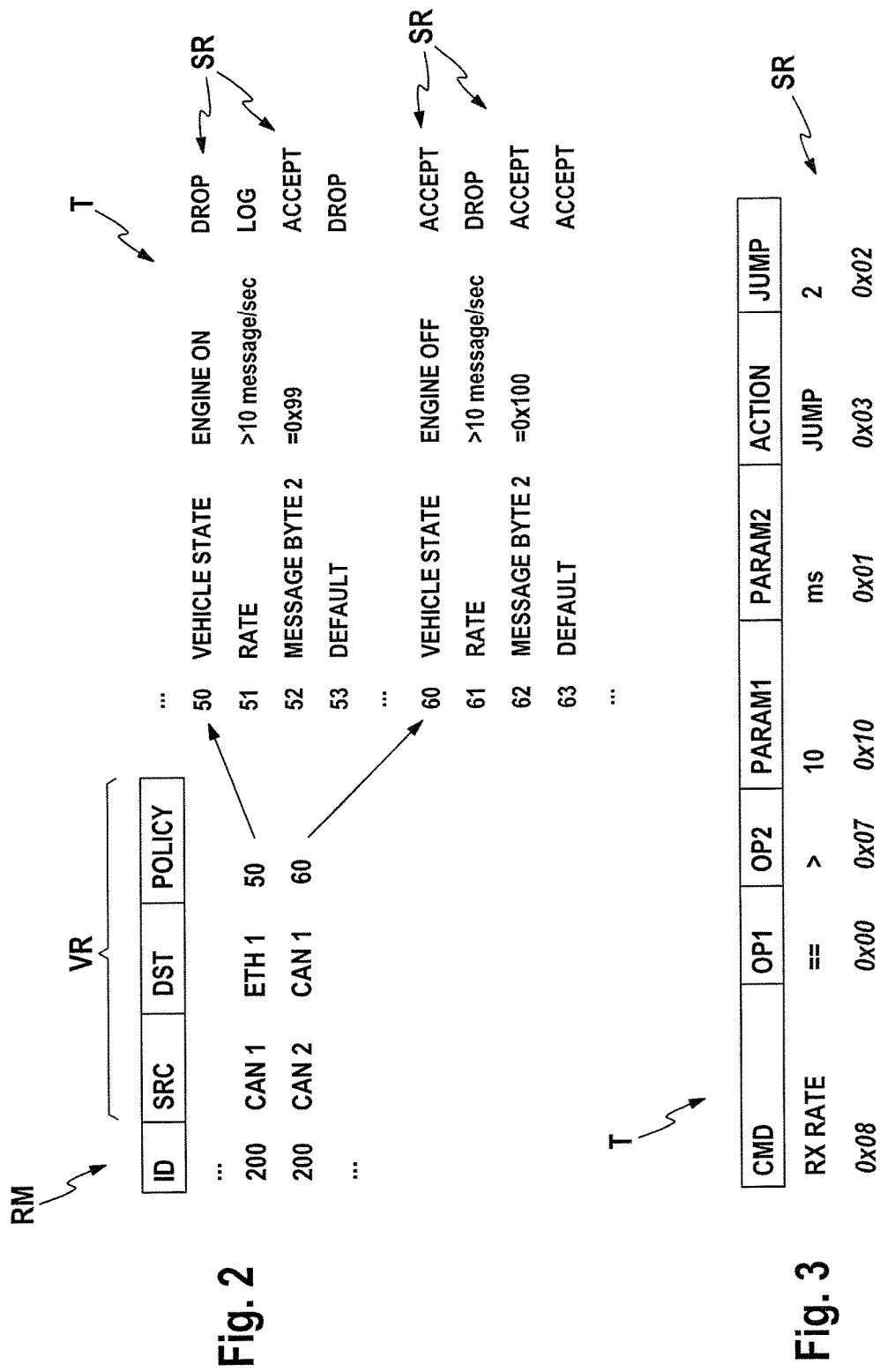

METHOD FOR OPERATING A SECURITY GATEWAY OF A COMMUNICATION SYSTEM FOR VEHICLES

CROSS REFERENCE TO RELATED APPLICATIONS

This application is the U.S. National Phase Application of PCT International Application No. PCT/US2013/074306, filed Dec. 11, 2013, the contents of such applications being incorporated by reference herein.

FIELD OF THE INVENTION

The invention relates to a method for operating a security gateway between data buses of a vehicle.

BACKGROUND OF THE INVENTION

Modern vehicles have a multiplicity of control devices which in each case carry out a specific function and are networked to form a link-up of control devices, for example by means of a CAN, MOST or FlexRay data bus to form a communication system. In order to provide also for an exchange of data between such different data buses having different communication protocols within the communication system, special control devices having a so-called gateway functionality are used with the aid of which a conversion of data can be achieved between the different data buses. Such gateways thus convert communication-protocol-specific data of a data bus into the communication-protocol-specific data of another data bus. Apart from forwarding messages (routing) which have communication-protocol-specific data and useful data, a change of the content of the useful data can also be carried out in a gateway.

From DE 11 2008 000 664 T5, which is incorporated by reference, a generic gateway for connecting a multiplicity of data buses with control devices is known. This gateway comprises a read-only memory in which a memory section has a routing matrix which specifies a correlation between an identification information item (ID) of a message to be forwarded and a data bus via which the message is to be forwarded. In order to be able to integrate further control devices into such a communication system, the messages of which are also to be conducted via a gateway, an additional routing matrix is generated automatically and stored in a random access memory which specifies a new correlation added so that the messages of the control devices newly added can also be forwarded.

It can be considered to be a disadvantage of this known gateway that the messages are forwarded in accordance with a predetermined scheme, namely in accordance with a rigid scheme corresponding to the predetermined and the additional routing matrix, and it is not possible to change such schemes dynamically.

SUMMARY OF THE INVENTION

An aspect of the present invention, therefore, specifies a security gateway of the type initially mentioned, by means of which messages to be forwarded can be filtered selectively by means of various criteria.

Such a method for operating a security gateway between data buses of a vehicle, in which a correlation between an identification information item of the message and a processing rule is provided by means of a routing matrix for each message arriving on a data bus, is characterized by the fact, according to the solution mentioned first, that at least one processing rule allocated to an identification information item has a reference information item to a security rule stored in a memory unit, which rule is used for filtering the message having this identification information item by means of an interpreter.

According to an aspect of the invention, a gateway having a routing matrix is thus extended in software by other components in that the routing matrix is extended by a reference to a security rule, such a security rule being stored in a particular memory area of a memory unit. In addition, the gateway functionality (application) is extended by a generic interpreter for the evaluation of the security rules for each message received. In this solution mentioned first it is not required that a reference information item is allocated to each identification information item.

By means of such security rules stored separately in a memory unit, a firewall is implemented in order to secure the vehicle against external IT attacks and to protect it.

According to the solution mentioned secondly, a method for operating a security gateway between data buses of a vehicle, in which a correlation between an identification information item (ID) of the message and a processing rule is provided by means of a routing matrix for each message arriving on a data bus, is characterized, in accordance with the invention, by the fact that a security rule which is used for filtering each incoming message by means of an interpreter is stored in a memory unit.

This solution mentioned secondly differs from the solution mentioned firstly in that a reference information item is omitted in the routing matrix and the interpreter immediately begins with processing and executing the security rule. Each message arriving at the security gateway is thus filtered in accordance with the security rule.

In this second solution mentioned, too, the security rules stored in a memory unit, which are used for filtering all incoming messages, are used for implementing a firewall for securing or protecting the vehicle from external IT attacks.

According to an advantageous embodiment of the invention, the security rule is set up generically as a filter function having at least one filter action. The filter action is preferably also associated with a parameter. Possible filter functions are the identification information item (ID), the message type, the message source, the message sink, the message transmission and/or message reception rate, the message authentication, the vehicle state, the control device state, the message content, the OBD (on-board diagnostic) state, the time interval to control devices/vehicle events and the default state.

According to a further embodiment of the invention, it is also provided that the security rule is set up with at least one parameter and/or at least one operator of the filter function. Possible parameters of the filter function are value ranges, physical and/or time values and message contents. The logical negation or a quantification can be used as operators.

According to a further embodiment of the invention, a number of security rules are stored in the memory unit, wherein the security rule to which the reference information points is executed as starting rule by the interpreter, and the subsequent security rules are executed in that the relevance of this security rule to the message is checked for each security rule by means of the filter function and possibly its operators and/or its parameters and, if relevant, the filter action is performed and otherwise the next security rule is executed.

If the reference information is omitted in the routing matrix, it is provided according to a development that similarly a number of security rules are provided which are executed by the interpreter in that the relevance of this security rule to the message is checked by means of the filter function and possibly its operators and/or its parameters and, if relevant, the filter action is performed and otherwise the next security rule is executed.

According to a development, the maximum number of executable security rules can be restricted in order to provide for a latency or a particular throughput of the messages.

Finally, it is particularly advantageous if, according to a development, the security rules are stored as calibration data in a flash memory. By this means, these security rules can be changed dynamically and adjusted in accordance with the specifications of a vehicle manufacturer as firewall rules.

BRIEF DESCRIPTION OF THE DRAWINGS

In the text which follows, the invention will be described in detail with reference to illustrative embodiments, referring to the attached figures, in which:

FIG. 2 shows a section from a routing matrix and a section of security rules, and FIG. 3 shows a presentation of the generic structure of a security rule.

DETAILED DESCRIPTION OF THE PREFERRED EMBODIMENTS

Figure 1:
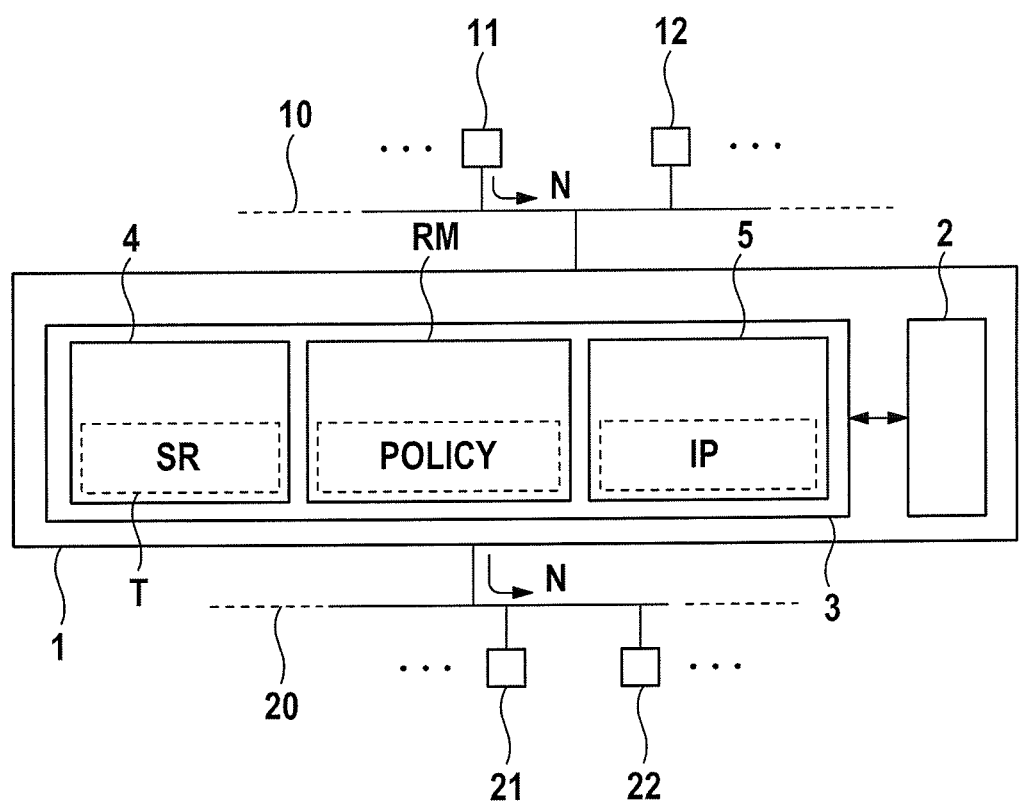
FIG. 1 shows a block diagram of a section from a communication system for a vehicle having a security gateway according to the invention.

The communication system according to FIG. 1 comprises at least two data buses 10 and 20 having in each case at least one control device, two control devices 11 and 12 and 21 and 22, respectively, being linked as subscribers, for example. These subscribers 11 and 12 and 21 and 22, respectively, in each case linked by the data buses 10 and 20 can exchange messages N via the respective data bus 10 or 20. Various systems are possible as data buses such as, for example, CAN, LIN, MOST, Firewire or FlexRay data buses. The two data buses 10 and 20 are connected via a security gateway 1 so that messages N can also be exchanged between subscribers 11 and 12 on data bus 10 and subscribers 21 and 22 on data bus 20, which can also have different communication protocols.

The security gateway 1 comprises a control unit 2 which communicates with a firewall 3 and handles the routing function. This firewall 3 has a routing matrix RM which specifies which messages N are forwarded from a bus 10 or 20 as data source SRC to the other bus 20 or 10 as data sink DST. For this purpose, an allocation to a processing rule VR is made for the identification information item ID of an incoming message N, which allocation specifies whether a message is allowed to be forwarded.

According to FIG. 2, the routing matrix RM contains as processing rule VR, apart from the information of the data source SRC and the data sink DST, a reference information item POLICY to a security rule SR. By way of example, a number of said security rules SR are listed in a table T in FIG. 2. According to this FIG. 2, a message N coming from a CAN1 bus as data source, having the ID=200 which is to be forwarded to an ETH1 bus (Ethernet), has a reference information item "50" whilst a further message coming from a CAN2 bus having the same ID, which is to be sent to a CAN1 bus, has a reference information item "60".

In order to be able to execute the security rules SR deposited in a table T in a calibration memory 4 as memory unit, the gateway functionality (application) of the security gateway 1 is extended by a generic interpreter IP in an application unit 5 of the firewall 3 for the evaluation of the security rules SR per received message.

For each incoming message N at firewall 3, prefiltering of the message N is initially performed by means of the routing matrix RM. Following that, filtering of the message N according to the security rule SR is performed by means of the reference information POLICY.

As explained above by means of FIG. 2, reference to the security rules SR is made via the reference information POLICY in the processing rule VR of the routing matrix RM. This ensures that the security rules SR relevant to this message N are executed with the reception of the message N.

As will be stated more precisely below, these security rules SR contain a filter function CMD and an associated filter action ACTION. According to FIG. 2, the filter rule SR thus indicates the vehicle state "VEHICLE STATE" with "ENGINE ON" with the reference information 50, "DROP" being indicated as filter action, that is to say this message N should be dropped. The reference information 60 leads to a filter rule SR in which the vehicle state "VEHICLE STATE" is specified as "ENGINE ON", where this message N is to be forwarded according to the filter action "ACCEPT". In the case of the security rule SR with the reference information 51, a LOG entry is provided as filter action "log".

According to FIG. 3, the structure of a security rule SR has the following generic structure:
  filter function CMD,
  no, one or more operators OP1, OP2 of the filter function CMD,
  no, one or more parameters PARAM1, PARAM2 of the filter function CMD,
  one or more filter actions ACTION, and
  no, one or more parameters JUMP of the filter action ACTION.

FIG. 3 shows an example of a possible type of coding of a security rule SR which, with an incoming message rate of greater than or equal to 10 ms, jumps to a filter function 2.
  Possible filter functions CMD are:
  the identification information item ID,
  the message type,
  the message source SRC
  the message sink DST
  the message transmission and/or reception rate,
  the message authentication
  the vehicle state,
  the control device state,
  the message content,
  the OBD (on-board diagnostic) state
  the time interval to control devices/vehicle events (for example the vehicle start), and
  the default state which always applies independently of operators and parameters.
  Possible operators OP1 and OP2 are:
  the logical negation (equal to, not equal to)
  quantification (value greater than, value less than, value equal to, value not equal to, etc.).
  Possible parameters (PARAM1 and PARAM2) are:
  value ranges,
  physical and/or time values,
  message contents.
  Possible filter actions (ACTION) are:
  accept message, discard message,
forward message temporarily to another data sink,
mark message,
start a LOG entry for a message,
change vehicle state (for example from "not attacked" to "attacked"),
jump to another security rule SR, and
return after a jump.

For some filter actions ACTION, an additional parameter JUMP is evaluated which specifies the jump destination in the case of a jump.

It is possible to fit the filter functions CMD and the filter actions ACTION with an arbitrarily high complexity. For example, the previous sequence of the diagnostic communication between two end points can be checked as filter function as to whether faults have occurred.

The interpreter IP of the firewall 3 of the security gateway 1 executes as security rules SR sequentially successively all subsequent security rules of table T beginning with the starting rule to which the reference information POLICY points. The number of security rules SR to be executed in this process can be unrestricted. However, it is also possible to restrict the maximum number of security rules SR to be executed in order to ensure, for example, a latency or a particular throughput of the messages N thereof. The limitation of the number of the security rules SR also defines the memory space of the calibration memory 4 needed for the security rules SR.

For each security rule from table T, it is checked by means of the filter function CMD including the operators OP1 and OP2 and the parameters PARAM1 and PARAM2 whether it applies, that is to say is true in terms of the logic of the statement. If this is not so, the process jumps to the next security rule SR in table T, otherwise filter action ACTION of the security rule SR is executed. In this context, the interpreter IP differentiates between 2 possible types of filter actions ACTION, namely a terminating and a non-terminating filter action. In the case of the one mentioned first, further processing stops because, for example, the message N has been accepted for forwarding; in the one mentioned last, processing is continued with the subsequent security rule SR since it has not yet been decided whether the message is to be accepted, temporarily forwarded or discarded.

In the illustrative embodiment according to FIG. 1, the reference to the security rules SR is made via the reference information POLICY in the routing matrix RM. It is possible to dispense with such a reference. Instead of such a reference, the firewall 3 is designed in such a manner that with the reception of a message N, the interpreter IP always begins with the first security rule SR listed in table T and executes it.

Since the security rules SR are deposited as table T in the calibration memory 4, designed, for example, as flash memory, of the security gateway 1, it is possible to specify these security rules SR by calibration via the vehicle manufacturer. These security rules SR are then applied dynamically to the vehicle on-board network messages. By this means, the vehicle can be secured and protected against IT attacks.

LIST OF REFERENCE SYMBOLS

1 Security gateway
2 Control unit of the security gateway 1
3 Firewall of the security gateway 1
4 Memory unit, calibration memory
5 Application unit
10 Data bus
11 Control device
12 Control device
20 Data bus
21 Control device
22 Control device

The invention claimed is:

1. A method for operating a security gateway between data buses of a vehicle, the method comprising:
  receiving, by the security gateway of the vehicle, a message (N) arriving on a first data bus of the vehicle, the message (N) having an identification information item (ID);
  filtering, by the security gateway, the message (N) based on a routing matrix (RM) including a source of the message (N) and a destination of the message (N) indicated in a processing rule (VR);
  determining, by the security gateway, a reference information item (POLICY) indicated in the processing rule (VR), the reference information item (POLICY) identifying a security rule (SR) stored in a memory unit;
  determining, by the security gateway, the security rule (SR) based on the reference information item (POLICY); and
  filtering, by an interpreter (IP) of the security gateway, the message (N) based on the security rule (SR), the security rule including a filtering action to be performed in response to a state of the vehicle or in response to a characteristic of the message,
  wherein a relevance of the security rule (SR) to the message (N) is checked by a filter function (CMD) and at least one of its operators (OP1, OP2) and/or its parameters (PARAM1, PARAM2), and if relevant, a filter action (ACTION) is performed.

2. The method according to claim 1, wherein the security rule (SR) is set up with at least one parameter (JUMP) of the filter action (ACTION).

3. The method according to claim 1, wherein a number of security rules (SR) are provided, wherein the security rule (SR) to which the reference information (POLICY) points is executed as a starting rule by the interpreter (IP), and the subsequent security rules (SR) are executed in that the relevance of this security rule (SR) to the message (N) is checked for each security rule (SR) by the filter function (CMD) and at least one of the operators (OP1, OP2) and/or at least one of the parameters (PARAM1, PARAM2) and, if relevant, the filter action (ACTION) is performed and otherwise a next security rule (SR) is executed.

4. The method according to claim 1, wherein a number of security rules (SR) are provided which are executed by the interpreter (IP) in that the relevance of this security rule (SR) to the message (N) is checked by the filter function (CMD) and at least one of the operators (OP1, OP2) and/or at least one of the parameters (PARAM1, PARAM2) and, if relevant, the filter action (ACTION) is performed and otherwise a next security rule (SR) is executed.

5. The method according to claim 3, wherein the maximum number of executable security rules (SR) is restricted.

6. The method according to claim 1, wherein the security rules (SR) are stored as calibration data in a flash memory.

7. The method according to claim 1, wherein the security rule (SR) is set up with at least one parameter (JUMP) of the filter action (ACTION).

8. The method according to claim 4, wherein the maximum number of executable security rules (SR) is restricted.

\* \* \* \* \*